United States Patent [19]
Gross

[11] Patent Number: 5,871,666
[45] Date of Patent: Feb. 16, 1999

[54] NON-V.O.C. EMULSIFIER FOR METHYL ESTERS

[75] Inventor: Stephen F. Gross, Souderton, Pa.

[73] Assignee: Henkel Corporation, Gulph Mills, Pa.

[21] Appl. No.: 870,341

[22] Filed: Jun. 6, 1997

[51] Int. Cl.⁶ .............................. B01J 13/00; B01F 17/42; B01F 17/56; C11D 1/831
[52] U.S. Cl. .................. 252/312; 252/355; 510/203; 510/274; 510/417
[58] Field of Search .................................... 252/312, 355; 510/203, 274, 417

[56] References Cited

U.S. PATENT DOCUMENTS

| | | | |
|---|---|---|---|
| 4,382,802 | 5/1983 | Beinke et al. | 252/312 X |
| 4,565,647 | 1/1986 | Llenado | 252/355 X |
| 5,143,639 | 9/1992 | Krawack | 510/417 X |
| 5,266,690 | 11/1993 | McCurry et al. | 536/18.6 |
| 5,401,326 | 3/1995 | Mihelic et al. | 510/274 X |
| 5,498,805 | 3/1996 | Koetzle | 510/417 X |
| 5,587,357 | 12/1996 | Rhinesmith | 510/417 |
| 5,670,471 | 9/1997 | Amalric et al. | 510/417 X |

*Primary Examiner*—Richard D. Lovering
*Attorney, Agent, or Firm*—Ernest G. Szoke; Wayne C. Jaeschke; Steven J. Trzaska

[57] ABSTRACT

An emulsifier composition containing: (a) from about 7 to about 15% by weight of an alkyl polyglycoside of formula I:

$$R_1O(R_2O)_b(Z)_a \qquad (I)$$

wherein $R_1$ is a monovalent organic radical having from about 6 to about 30 carbon atoms; $R_2$ is a divalent alkylene radical having from 2 to 4 carbon atoms; Z is a saccharide residue having 5 or 6 carbon atoms; b is a number having a value from 0 to about 12; a is a number having a value from 1 to about 6; (b) from about 9 to about 17% by weight of an alkoxylated linear alcohol; (c) from about 11 to about 19% by weight of linear alkyl sulfonate; (d) from about 1 to about 5% by weight of a monoethanolamine; and (e) remainder, water, all weights being based on the total weight of the composition.

35 Claims, No Drawings

1
NON-V.O.C. EMULSIFIER FOR METHYL ESTERS

FIELD OF THE INVENTION

The present invention generally relates to an emulsifier for methyl esters. More particularly, the invention relates to an emulsifier composition capable of emulsifying methyl esters of varying carbon chain length, wherein the emulsifier is both biodegradable and free of any volatile organic compounds.

BACKGROUND OF THE INVENTION

Methyl esters comprise any of a group of fatty esters derived from coconut and other vegetable oils, tallow, and the like. These compounds contain alkyl groups ranging from $C_8$–$C_{18}$ in varying percentages, i.e., having varying carbon chain length distributions.

Methyl esters are used in a variety of commercial and industrial applications. Examples of application include their use in metal degreasing, paint stripping and graffiti removal as well as lubricants in the production of metals, i.e., in metal-cutting fluids, high-temperature grinding of metals, and the cold-rolling of steel. Additional applications include their use in lacquers, paints and varnishes, plasticizers and the formation of polymeric materials.

While the majority of commercially used methyl esters are formed synthetically by the reaction of methanol with an organic $C_8$–$C_{18}$ acid in the presence of a catalyst such as sulfuric acid or p-toluenesulfonic acid, they also are known to occur in nature. Recovery of naturally occurring methyl esters may be accomplished by steam distillation, extraction or pressing, or by a combination of these processes.

In order to effectively utilize the favorable physical and chemical properties of methyl esters, it is often times necessary to emulsify them into a disperse, homogeneous form. Typical emulsifiers for methyl esters involve ingredients which contain volatile organic compounds. Examples of volatile organic compounds generally employed as emulsifiers for methyl esters include cosurfactants such as $C_3$–$C_5$ alcohols and glycol ethers. Due to recent ecotoxicological awareness, the use of volatile organic compounds is undesirable.

SUMMARY OF THE INVENTION

The present invention is directed to an emulsifier composition for emulsifying methyl esters. The emulsifier composition contains: (a) an alkyl polyglycoside, (b) an alkoxylated linear alcohol, (c) a neutralized monoethanolamine salt of a linear alkyl sulfonic acid, and (d) water.

The present invention is also directed to a methyl ester microemulsion containing: (a) from about 25 to about 77% by weight of the above-disclosed emulsifier composition and (b) from about 1 to about 50% by weight of a methyl ester, all weights being based on the weight of the microemulsion.

The present invention is also directed to a process for emulsifying a methyl ester involving combining the above-disclosed emulsifier and a methyl ester in a ratio by weight of from about 15:1 to about 1:1.

DESCRIPTION OF THE INVENTION

Other than in the operating examples, or where otherwise indicated, all numbers expressing quantities of ingredients or reaction conditions used herein are understood as being modified in all instances by the term "about".

The alkyl polyglycosides which can be used in the present invention correspond to formula I:

$$R_1O(R_2O)_b(Z)_a \qquad (I)$$

wherein $R_1$ is a monovalent organic radical having from about 6 to about 30 carbon atoms; $R_2$ is a divalent alkylene radical having from 2 to 4 carbon atoms; Z is a saccharide residue having 5 or 6 carbon atoms; b is a number having a value from 0 to about 12; a is a number having a value from 1 to about 6. Preferred alkyl polyglycosides which can be used in the compositions according to the invention have the formula I wherein Z is a glucose residue and b is zero. Such alkyl polyglycosides are commercially available, for example, as APG®, GLUCOPON®, or PLANTAREN® surfactants from Henkel Corporation, Ambler, Pa., 19002. Examples of such surfactants include but are not limited to:

1. APG® 225 Surfactant—an alkyl polyglycoside in which the alkyl group contains 8 to 10 carbon atoms and having an average degree of polymerization of 1.7.
2. GLUCOPON® 425 Surfactant—an alkyl polyglycoside in which the alkyl group contains 8 to 16 carbon atoms and having an average degree of polymerization of 1.48.
3. GLUCOPON® 625 Surfactant—an alkyl polyglycoside in which the alkyl group contains 12 to 16 carbon atoms and having an average degree of polymerization of 1.6.
4. APG® 325 Surfactant—an alkyl polyglycoside in which the alkyl group contains 9 to 11 carbon atoms and having an average degree of polymerization of 1.5.
5. GLUCOPON® 600 Surfactant—an alkyl polyglycoside in which the alkyl group contains 12 to 16 carbon atoms and having an average degree of polymerization of 1.4.
6. PLANTAREN® 2000 Surfactant—an alkyl polyglycoside in which the alkyl group contains 8 to 16 carbon atoms and having an average degree of polymerization of 1.4.
7. PLANTAREN® 1300 Surfactant—an alkyl polyglycoside in which the alkyl group contains 12 to 16 carbon atoms and having an average degree of polymerization of 1.6.

Other examples include alkyl polyglycoside surfactant compositions which are comprised of mixtures of compounds of formula I wherein Z represents a moiety derived from a reducing saccharide containing 5 or 6 carbon atoms; a is a number having a value from 1 to about 6; b is zero; and $R_1$ is an alkyl radical having from 8 to 20 carbon atoms. The compositions are characterized in that they have increased surfactant properties and an HLB in the range of about 10 to about 16 and a non-Flory distribution of glycosides, which is comprised of a mixture of an alkyl monoglycoside and a mixture of alkyl polyglycosides having varying degrees of polymerization of 2 and higher in progressively decreasing amounts, in which the amount by weight of polyglycoside having a degree of polymerization of 2, or mixtures thereof with the polyglycoside having a degree of polymerization of 3, predominate in relation to the amount of monoglycoside, said composition having an average degree of polymerization of about 1.8 to about 3. Such compositions, also known as peaked alkyl polyglycosides, can be prepared by separation of the monoglycoside from the original reaction mixture of alkyl monoglycoside and alkyl polyglycosides after removal of the alcohol. This separation may be carried out by molecular distillation and normally results in the removal of about 70–95% by weight of the alkyl monoglycosides. After removal of the alkyl monoglycosides, the relative distribution of the various components, mono- and polyglycosides, in the resulting product changes and the concentration in the product of the polyglycosides relative to the monoglycoside increases as well as the concentration of individual polyglycosides to the total, i.e. DP2 and DP3 fractions in relation to the sum of all DP fractions. Such compositions are disclosed in U.S. Pat. No. 5,266,690, the entire contents of which are incorporated herein by reference.

Other alkyl polyglycosides which can be used in the compositions according to the invention are those in which the alkyl moiety contains from 6 to 18 carbon atoms and the average carbon chain length of the composition is from about 9 to about 14 comprising a mixture of two or more of at least binary components of alkylpolyglycosides, wherein each binary component is present in the mixture in relation to its average carbon chain length in an amount effective to provide the surfactant composition with the average carbon chain length of about 9 to about 14 and wherein at least one, or both binary components, comprise a Flory distribution of polyglycosides derived from an acid-catalyzed reaction of an alcohol containing 6–20 carbon atoms and a suitable saccharide from which excess alcohol has been separated.

A particularly preferred alkyl polyglycoside is one wherein $R_1$ is a monovalent organic radical having from about 8 to about 10 carbon atoms, b is zero, and a is a number having a value of from about 1 to about 3, and preferably about 1.5.

The alkoxylated linear alcohols which may be used in the present invention are the condensation products of organic $C_8$–$C_{16}$ alcohols which are alkoxylated with from about 1 to about 6 moles of ethylene oxide and from about 1 to about 9 moles of propylene oxide, per mole of alcohol. A particularly preferred alkoxylated linear alcohol in a $C_{12-14}$ fatty alcohol having 3 moles of ethylene oxide and 6 moles of propylene oxide.

In general, any linear alkyl sulfonate may be employed in the present invention. The sulfonate group, —$SO_3M$ attached to an alkyl, aryl or alkylaryl hydrophobe is a highly effective solubilizing group. Sulfonic acids are strong acids and their salts are relatively unaffected by pH. They are stable to both oxidation and, because of the strength of the C—S bond, also to hydrolysis. They interact moderately with the hardness ions $Ca^{2+}$ and $Mg^{2+}$, significantly less so than carboxylates. Modification of the hydrophobe in sulfonate surfactants, by introduction of double bonds or ester or amide groups into the hydrocarbon chain or as substituents, yield surfactants that offer specific performance advantages.

Because the introduction of the $SO_3H$ function is inherently inexpensive, e.g., by oleum, $SO_3$, $SO_2$, $Cl_2$, or $NaHSO_3$, sulfonates are heavily represented among the high-volume surfactants. While representative sulfonates include alkylarenesulfonates, short-chain lignosulfates, naphthalenesulfonates, alpha-olefinsulfonates, petroleum sulfonates, and sulfonates with ester, amide or ether linkages, the present invention is directed to the use of linear alkyl sulfonates (LAS), i.e., straight-chain alkylbenzenesulfonates in its surfactant composition. The linear alkylates thereof may be normal or iso (branched at the end only), and must have at least 10 carbon atoms.

The preferred linear alkyl sulfonates of the present invention contain a straight alkyl chain having from about 10 to about 15 carbon atoms, most preferably from about 11 to about 13 carbon atoms, and the cation is sodium, potassium, ammonium, mono-, di-, or triethanolammonium, calcium or magnesium and mixtures thereof. Suitable straight-chain alkylbenzenesulfonates include $C_{10-15}$ alkylbenzenesulfonates. A particularly preferred linear alkyl sulfonate for use in the present invention is dodecylbenzenesulfonate.

The linear alkyl sulfonic acid is neutralized by the addition of a monoethanolamine (MEA) to form an MEA salt of a linear alkyl sulfonic acid. Thus, the preferred linear alkyl sulfonate is a monoethanolammonium dodecylbenzenesulfonate. It should be noted, however, that diethanolamines can also be employed to form a diethanolamine salt of a linear alkyl sulfonic acid.

According to one embodiment of the present invention, there is provided an emulsifier composition for emulsifying methyl esters. The emulsifier composition contains: (a) from about 7 to about 15% by weight, and preferably from about 10 to about 12% by weight of an alkyl polyglycoside, (b) from about 9 to about 17% by weight, and preferably from about 12 to about 14% by weight of an alkoxylated linear alcohol, (c) from about 11 to about 19% by weight, and preferably from about 14 to about 16% by weight of a linear alkyl sulfonic acid, (d) from about 1 to about 5% by weight, and preferably from about 2 to about 4% by weight of a component selected from the group consisting of a monoethanolamine and a diethanolamine, preferably a monoethanolamine, and (d) remainder, water, all weights being based on the total weight of the emulsifier composition. The pH of the emulsifier composition is in the range of from about 7 to about 11, and preferably from about 8.5 to about 9.5.

The above-disclosed emulsifier composition is characterized by its effectiveness at emulsifying methyl esters having varying alkyl chain lengths without the need for using any volatile organic compounds in the emulsifier composition. Moreover, all ingredients contained in the emulsifier composition are biodegradable.

According to another aspect of the present invention, there is also provided a process for emulsifying a methyl ester. Preferred methyl esters are those derived from the esterification of unsaturated acids having from about 8 to about 22 carbon atoms. Particularly preferred methyl esters include methyl caprylate/caprate and methyl soyate. There is thus provided a process for emulsifying a methyl ester involving combining the above-disclosed emulsifier composition and a methyl ester in a ratio by weight of from about 15:1 to about 1:1. It should be noted, however, that the precise amount of emulsifier composition used to emulsify a methyl ester will depend on the alkyl chain length of the methyl ester. Longer alkyl chain length methyl esters require more emulsifier to be used as compared to shorter alkyl chain length methyl esters which require less emulsifier. The precise amount of the emulsifier composition of the present to be used in combination with the particular methyl ester chosen will be determined by the formulator.

According to another embodiment of the present invention, there is provided a methyl ester microemulsion containing a mixture of the above-disclosed emulsifier composition and a methyl ester wherein the emulsifier composition and methyl ester are combined in a ratio by weight of from about 15:1 to about 1:1. Once again, it should be noted that the precise amount of emulsifier composition used to emulsify the methyl ester will depend on the alkyl chain length of the methyl ester. Longer alkyl chain length methyl esters require more emulsifier to be used as compared to shorter alkyl chain length methyl esters which require less emulsifier. The precise amount of the emulsifier composition used in combination with the particular methyl ester chosen will be determined by the formulator.

The present invention will be better understood from the examples which follow, all of which are intended for illustrative purposes only, and are not meant to unduly limit the scope of the invention in any way.

EXAMPLES

An emulsifier composition in accordance with the present invention was formulated as seen below:

FORMULATION 1

| Component | %/wt. |
|---|---|
| (a) GLUCOPON ® 220 UP | 18.28 |
| (b) DEHYPON® LS-36 | 12.81 |
| (c) Dodecylbenzene sulfonic acid | 15.63 |
| (d) Monoethanolamine | 3.28 |
| (e) Water | 50.00 |

The above-disclosed emulsifier composition was then combined with varying amounts of a methyl soyate (Examples 1–8) and a methyl caprylate/caprate (Examples 9–12) and water to form methyl ester microemulsions in order to determine the maximum amounts of these particular methyl esters that can be effectively emulsified by the emulsifier composition of the present invention. The precise formulations are found in Table 1 below.

TABLE 1

Microemulsion Formulations 1.–12.

| | 1. | 2. | 3. | 4. | 5. | 6. | 7. | 8. |
|---|---|---|---|---|---|---|---|---|
| % wt. methyl soyate | 23 | 20 | 17 | 14 | 11 | 8 | 5 | 3 |
| % wt. Formulation 1 | 77 | 73 | 68 | 63 | 59 | 54 | 49 | 46 |
| % wt. Water | 0 | 7 | 15 | 23 | 30 | 37 | 46 | 51 |

| | 9. | 10. | 11. | 12. |
|---|---|---|---|---|
| % wt. Methyl caprylate/caprate | 45 | 28 | 23 | 12 |
| % wt. Formulation 1 | 55 | 54 | 52 | 45 |
| % wt. Water | 0 | 18 | 25 | 43 |

As can be seen from the data in Table 1, Formulation 1 can be used to micro-emulsify up to 23% Methyl Soyate and up to 45% Methyl Caprylate/caprate. The use of Formulation 1 results in the effective formation of methyl ester microemulsions whose components are both biodegradable and free of any volatile organic compounds.

What is claimed is:

1. An emulsifier composition comprising:
   (a) from about 25 to about 77% by weight of an alkyl polyglycoside of formula I

   $$R_1O(R_2O)_b(Z)_a \qquad (I)$$

wherein $R_1$ is a monovalent organic radical having from about 6 to about 30 carbon atoms, $R_2$ is divalent alkylene radical having from 2 to 4 carbon atoms; Z is a saccharide residue having 5 or 6 carbon atoms; b is a number having a value from 0 to about 12; a is a number having a value from 1 to about 6;
   (b) from about 9 to about 17% by weight of an alkoxylated linear alcohol which is alkoxylated with ethylene oxide and propylene oxide;
   (c) from about 11 to about 19% by weight of linear alkyl, aryl or alkylaryl sulfonate;
   (d) from about 1 to about 5% by weight of a monoethanolamine; and
   (e) remainder, water, all weights being based on the total weight of the composition.

2. The composition of claim 1 wherein in formula I, $R_1$ is a monovalent organic radical having from about 8 to about 10 carbon atoms, b is zero, and a is a number having a value of from about 1 to about 3.

3. The composition of claim 1 wherein the alkyl polyglycoside is present in the composition in an amount of from about 10 to about 12% by weight, based on the weight of the composition.

4. The composition of claim 1 wherein the alkoxylated linear alcohol is a $C_{12}$–$C_{14}$ fatty alcohol having 3 moles of ethylene oxide and 6 moles of propylene oxide.

5. The composition of claim 1 wherein the alkoxylated linear alcohol is present in the composition in an amount of from about 12 to about 14% by weight, based on the weight of the composition.

6. The composition of claim 1 wherein the linear alkyl aryl sulfonate is dodecylbenzene sulfonate.

7. The composition of claim 1 wherein the linear alkyl aryl sulfonate is present in the composition in an amount of from about 14 to about 16% by weight, based on the weight of the composition.

8. The composition of claim 1 wherein the monoethanolamine is present in the composition in an amount of from about 2 to about 4% by weight, based on the weight of the composition.

9. The composition of claim 1 having a pH ranging from about 7 to about 11.

10. The composition of claim 1 wherein the composition is free of any volatile organic compounds.

11. A process for emulsifying a methyl ester comprising:
    (a) providing an emulsifier composition comprising:
       (i) from about 7 to about 15% by weight of an alkyl polyglycoside of formula

       $$R_1O(R_2O)_b(Z)_a \qquad (I)$$

wherein $R_1$ is a monovalent organic radical having from about 6 to about 30 carbon atoms; $R_2$ is divalent alkylene radical having from 2 to 4 carbon atoms; Z is a saccharide residue having 5 or 6 carbon atoms; b is a number having a value from 0 to about 12; a is a number having a value from 1 to about 6;
       (ii) from about 9 to about 17% by weight of an alkoxylated linear alcohol which is alkoxylated with ethylene oxide and propylene oxide;
       (iii) from about 11 to about 19% by weight of a linear alkyl, aryl or alkylaryl sulfonate;
       (iv) from about 1 to about 5% by weight of a monoethanolamine; and
       (v) remainder, water, all weights being based on the total weight of the composition;
    (b) providing a methyl ester having an alkyl chain length of from about 8 to about 18 carbon atoms; and
    (c) mixing (a) and (b) in a ratio by weight ranging from about 15:1 to about 1:1.

12. The process of claim 11 wherein in formula I, $R_1$ is a monovalent organic radical having from about 8 to about 10 carbon atoms, b is zero, and a is a number having a value of from about 1 to about 3.

13. The process of claim 11 wherein the alkyl polyglycoside is present in the composition in an amount of from about 10 to about 12% by weight, based on the weight of the composition.

14. The process of claim 11 wherein the alkoxylated linear alcohol is a $C_{12}$–$C_{14}$ fatty alcohol having 3 moles of ethylene oxide and 6 moles of propylene oxide.

15. The process of claim 11 wherein the alkoxylated linear alcohol is present in the composition in an amount of from about 12 to about 14% by weight, based on the weight of the composition.

16. The process of claim 11 wherein the linear alkyl aryl sulfonate is dodecylbenzene sulfonate.

17. The process of claim 11 wherein the linear alkyl aryl sulfonate is present in the composition in an amount of from about 14 to about 16% by weight, based on the weight of the composition.

18. The process of claim 11 wherein the monoethanolamine is present in the composition in an amount of from about 2 to about 4% by weight, based on the weight of the composition.

19. The process of claim 11 wherein the emulsifier composition has a pH ranging from about 8.5 to about 9.5.

20. The process of claim 11 wherein the composition is free of any volatile organic compounds.

21. The process of claim 11 wherein the emulsifier composition and the methyl ester are mixed in a ratio by weight of about 4:1.

22. The process of claim 11 wherein the methyl ester is selected from the group consisting of methyl soyate and methyl caprylate/caprate.

23. A methyl ester microemulsion comprising:
   (a) an emulsifier composition comprising:
      (i) from about 7 to about 15% by weight of an alkyl polyglycoside of formula

      $$R_1O(R_2O)_b(Z)_a \qquad (I)$$

wherein $R_1$ is a monovalent organic radical having from about 6 to about 30 carbon atoms; $R_2$ is divalent alkylene radical having from 2 to 4 carbon atoms; Z is a saccharide residue having 5 or 6 carbon atoms; b is a number having a value from 0 to about 12; a is a number having a value from 1 to about 6;
      (ii) from about 9 to about 17% by weight of an alkoxylated linear alcohol which is alkoxylated with ethylene oxide and propylene oxide;
      (iii) from about 11 to about 19% by weight of linear alkyl, aryl or alkylaryl sulfonate;
      (iv) from about 1 to about 5% by weight of a monoethanolamine; and
      (v) remainder, water, all weights being based on the total weight of the composition; and
   (b) a methyl ester having an alkyl chain length of from about 8 to about 18 carbon atoms.

24. The microemulsion of claim 23 wherein in formula I, $R_1$ is a monovalent organic radical having from about 8 to about 10 carbon atoms, b is zero, and a is a number having a value of from about 1 to about 3.

25. The microemulsion of claim 23 wherein the alkyl polyglycoside is present in the composition in an amount of from about 9 to about 13% by weight, based on the weight of the composition.

26. The microemulsion of claim 23 wherein the alkoxylated linear alcohol is a $C_{12}$–$C_{14}$ fatty alcohol having 3 moles of ethylene oxide and 6 moles of propylene oxide.

27. The microemulsion of claim 23 wherein the alkoxylated linear alcohol is present in the composition in an amount of from about 12 to about 14% by weight, based on the weight of the composition.

28. The microemulsion of claim 23 wherein the linear alkyl aryl sulfonate is dodecylbenzene sulfonate.

29. The microemulsion of claim 23 wherein the linear alkyl aryl sulfonate is present in the composition in an amount of from about 14 to about 16% by weight, based on the weight of the composition.

30. The microemulsion of claim 23 wherein the monoethanolamine is present in the composition in an amount of from about 2 to about 4% by weight, based on the weight of the composition.

31. The microemulsion of claim 23 wherein the emulsifier composition has a pH ranging from about 8.5 to about 9.5.

32. The microemulsion of claim 23 wherein the composition is free of any volatile organic compounds.

33. The microemulsion of claim 23 wherein the emulsifier composition and the methyl ester are mixed in a ratio by weight ranging from about 15:1 to about 1:1.

34. The microemulsion of claim 23 wherein the emulsifier composition and the methyl ester are mixed in a ratio by weight of about 4:1.

35. The microemulsion of claim 23 wherein the methyl ester is selected from the group consisting of methyl soyate and methyl caprylate/caprate.

* * * * *